(12) United States Patent
Kajio (10) Patent No.: US 10,234,041 B2
(45) Date of Patent: Mar. 19, 2019

(54) FLUID CONTROL VALVE

(71) Applicant: AISIN SEIKI KABUSHIKI KAISHA, Kariya-shi, Aichi-ken (JP)

(72) Inventor: Katsuhiro Kajio, Anjo (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 2 days.

(21) Appl. No.: 15/645,418

(22) Filed: Jul. 10, 2017

(65) Prior Publication Data

US 2018/0073641 A1 Mar. 15, 2018

(30) Foreign Application Priority Data

Sep. 9, 2016 (JP) .................. 2016-177045

(51) Int. Cl.
| | |
|---|---|
| *F16K 1/36* | (2006.01) |
| *F16K 1/12* | (2006.01) |
| *F16K 1/42* | (2006.01) |
| *F16K 31/04* | (2006.01) |
| *F16K 41/12* | (2006.01) |
| *H01M 8/04* | (2016.01) |
| *H01M 8/04082* | (2016.01) |
| *F16K 1/48* | (2006.01) |

(Continued)

(52) U.S. Cl.
CPC ............ *F16K 1/36* (2013.01); *F16K 1/12* (2013.01); *F16K 1/42* (2013.01); *F16K 1/485* (2013.01); *F16K 31/04* (2013.01); *F16K 41/12* (2013.01); *H01M 8/04201* (2013.01); *H01M 8/04089* (2013.01); *H01M 8/04156* (2013.01); *H01M 2250/20* (2013.01)

(58) Field of Classification Search
USPC ..... 251/84, 86, 88, 61, 61.4, 61.6, 318, 320, 251/323, 326, 328
See application file for complete search history.

(56) References Cited

U.S. PATENT DOCUMENTS 4,106,747 A * 8/1978 Malacheski ............. F16K 1/487
251/215
2008/0073605 A1 3/2008 Ishigaki et al.

FOREIGN PATENT DOCUMENTS

| JP | 2008-75827 A | 4/2008 |
|---|---|---|
| JP | 2011-132974 A | 7/2011 |
| JP | 2013-87801 A | 5/2013 |

(Continued)

*Primary Examiner* — R. K. Arundale
*Assistant Examiner* — Daphne M Barry
(74) *Attorney, Agent, or Firm* — Buchanan Ingersoll & Rooney PC (57) ABSTRACT

A fluid control valve includes: a shaft member that moves along an axis of the shaft by a driving force from a driving source connected to one end of the shaft member; a valve body that is connected to the other end of the shaft member and includes a flat plate shaped main body portion having an outer periphery to which a sealing member is fixed; a housing that includes an inlet and an outlet, has an annular valve seat, and accommodates the shaft member and the valve body, in which the valve body is capable of swinging with respect to the shaft member, the valve seat includes an abutment portion and a protruding portion, and a tip end of the protrusion portion abuts on the main body portion in the state where the sealing member abuts on the abutment portion, so as to regulate movement of the valve body.

19 Claims, 6 Drawing Sheets

(51) Int. Cl.
 *H01M 8/04119* (2016.01)
 *H01M 8/04089* (2016.01)

(56) References Cited

FOREIGN PATENT DOCUMENTS

| | | |
|---|---|---|
| JP | 2013-87802 A | 5/2013 |
| JP | 2013-087803 A | 5/2013 |
| JP | 2016-008683 A | 1/2016 |

* cited by examiner

FLUID CONTROL VALVE

CROSS REFERENCE TO RELATED APPLICATIONS

This application is based on and claims priority under 35 U.S.C. § 119 to Japanese Patent Application 2016-177045, filed on Sep. 9, 2016, the entire contents of which are incorporated herein by reference.

TECHNICAL FIELD

This disclosure relate to a fluid control valve that controls a flow rate and a pressure of a fluid.

BACKGROUND DISCUSSION

In the related art, there is known a poppet valve type fluid control valve that controls a flow rate of air supplied to various devices (e.g., a fuel cell or a three-way catalyst converter) mounted on a vehicle (see, e.g., JP 2013-087803A (Reference 1) and JP 2016-008683A (Reference 2)). The fluid control valve includes a shaft member that moves along an axis by a driving force of a driving source, a valve body connected to the tip end of the shaft member, and a housing that has an annular valve seat on which the valve body abuts and accommodates the shaft member and the valve body.

In the fluid control valve of Reference 1, the valve body is configured to be capable of swinging with respect to the shaft member, and a forward-direction driving force is applied to the shaft member such that the sealing member of the valve body is pressed against the valve seat over the entire circumference of the valve seat.

In the fluid control valve of Reference 2, a first protruding portion and a second protruding portion are formed in the sealing member provided in the valve seat. The first protruding portion protrudes toward the valve body, and the second protruding portion has a larger protrusion amount than that of the first protruding portion. The fluid control valve of Reference 2 has a double sealing structure in which, when the valve body is closed, the second protruding portion abuts on the valve body to be elastically deformed so that foreign matters such as water droplets attached to the valve body are scraped off, and subsequently, the first protruding portion comes into contact with the valve body.

However, in the poppet valve type fluid control valve, when the valve body is closed, the parallelism between the valve body and the valve seat may not be constant due to a fluid pressure received by the valve body from the fluid or a dimensional error of components. As a result, a problem occurs in that a gap is formed between the valve body and the valve seat, and thus, the sealing function is deteriorated.

In the fluid control valve of Reference 1, since the valve body swings with respect to the shaft member such that the sealing member of the valve body is pressed against the valve seat over the entire circumference of the valve seat, the sealing performance is high. However, excessive pressing stress may be applied to the sealing member, and thus, the durability of the sealing member may be impaired.

Further, in the fluid control valve of Reference 2, the sealing performance is improved by the double sealing structure. However, when the valve body is pressed against the valve seat by moving the shaft member, excessive pressing stress may be applied to the sealing member, and thus, the durability of the sealing member may be impaired.

Thus, a need exists for a fluid control valve which is not susceptible to the drawback mentioned above.

SUMMARY

A feature of a fluid control valve resides in that the fluid control valve includes: a shaft member that moves along an axis of the shaft by a driving force from a driving source connected to one end of the shaft member; a valve body that is connected to the other end of the shaft member and includes a flat plate shaped main body portion having an outer periphery to which a sealing member is fixed; a housing that includes an inlet and an outlet for a fluid, has an annular valve seat on which the valve body abuts to block a communication between the inlet and the outlet, and accommodates the shaft member and the valve body, wherein the valve body is configured to be capable of swinging with respect to the shaft member, the valve seat includes an abutment portion on which the sealing member abuts, and a protruding portion that protrudes toward the main body portion from the abutment portion in a state of extending radially inward from the abutment portion, and a tip end of the protrusion portion abuts on the main body portion in the state where the sealing member abuts on the abutment portion, so as to regulate movement of the valve body.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments of a fluid control valve will be described with reference to the drawings. In the embodiments, an air pressure regulating valve 3 (an example of the fluid control valve) provided in an oxygen supply module 2 of a fuel cell system 1 will be described as an example of the fluid control valve. However, this disclosure is not limited to the embodiments, and various modifications may be made within a scope that does not depart from the gist of this disclosure.

<Fuel Cell System>

Figure 1:
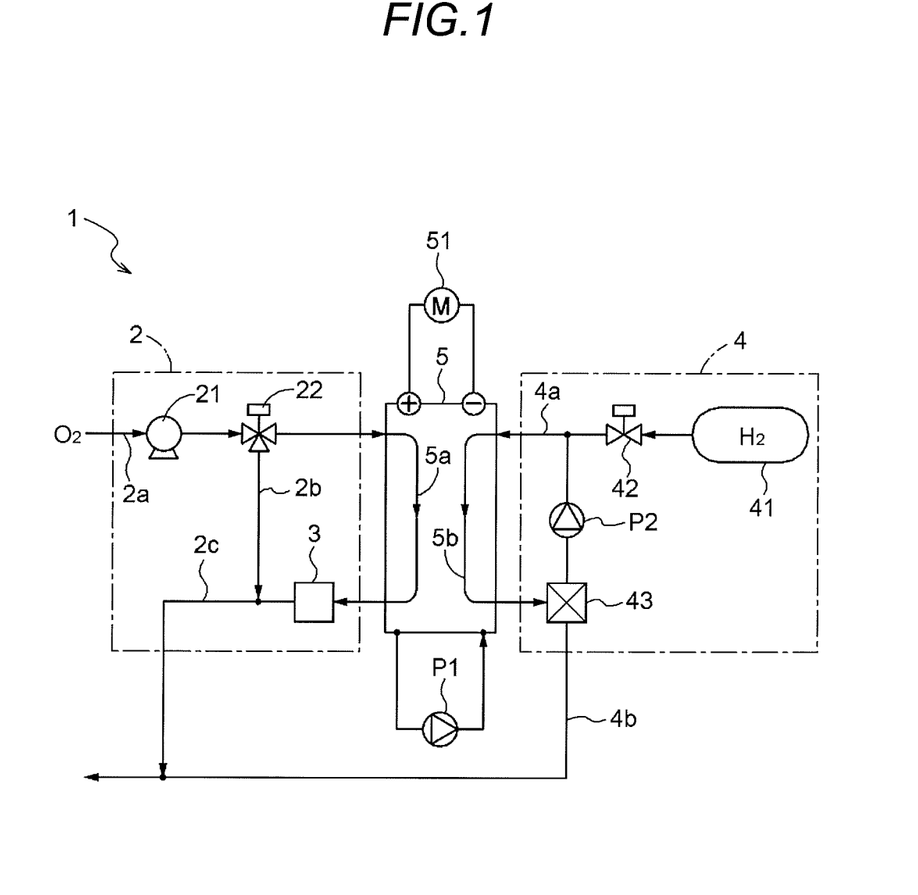
FIG. 1 is a schematic view illustrating a fuel cell system.

As illustrated in FIG. 1, in this embodiment, an electric motor 51 is used as a driving source of a vehicle such as an automobile or a general industrial machine. An electric power generated by the fuel cell system 1 is supplied to the electric motor 51. The fuel cell system 1 includes a fuel cell 5, the oxygen supply module 2 that supplies air to the fuel cell 5, and a fuel supply module 4 that supplies hydrogen gas to the fuel cell 5. In addition, when the electric power generated in the fuel cell 5 is supplied to the electric motor 51, a surplus electric power may be stored in a battery, and there is no specific limitation in this regard.

The fuel cell 5 is configured by laminating cell units, in which cells each having an electrolyte sandwiched between a fuel pole and an air pole are divided by separators, in series. An air flow path 5a is formed in the separator facing the air pole to cause oxygen-containing air to flow therein, and a hydrogen flow path 5b is formed in the separator facing the fuel pole to cause hydrogen gas to flow therein. In the fuel cell 5, the hydrogen gas becomes hydrogen ions to pass through the electrolyte and chemically react with oxygen so that water (steam) is generated, and the side of the fuel pole becomes a negative pole, and the side of the air pole becomes a positive pole so that an electric power is supplied to the electric motor 51. In addition, cooling water is circulated by a water cooling pump P1 in order to cool the fuel cell 5.

The oxygen supply module 2 includes an air supply path 2a to supply the oxygen-containing air to the fuel cell 5 by a compressor 21. The air supply path 2a is connected to the air flow path 5a of the fuel cell 5, and a cross valve 22 is disposed between the compressor 21 and the air flow path 5a. One end of a bypass flow path 2b is connected to the cross valve 22, and the other end of the bypass flow path 2b is connected to an oxygen-side discharge path 2c. By displacing the valve position of the cross valve 22, a part of the air is discharged to the oxygen-side discharge path 2c via the bypass flow path 2b so as to regulate the amount of the air supplied to the air flow path 5a of the fuel cell 5. Further, although an air filter that removes foreign matters contained in the air or an intercooler that cools the air compressed by the compressor 21 is appropriately installed in the air supply path 2a, illustration thereof is omitted.

One end of the oxygen-side discharge path 2c is connected to the outlet of the air flow path 5a of the fuel cell 5, and the other end thereof is joined with a fuel-side discharge path 4b to be described later. The air that is not used for the generation or the water (steam) generated by the generation is discharged from the oxygen-side discharge path 2c. In the present embodiment, the air pressure regulating valve 3 is disposed on the oxygen-side discharge path 2c, and installed between the outlet of the air flow path 5a of the fuel cell 5 and the other end of the bypass flow path 2b. Although the detailed configuration of the air pressure regulating valve 3 will be described later, the air pressure regulating valve 3 controls the internal pressure of the fuel cell 5 by regulating the discharge amount of the air remaining inside the fuel cell 5.

The fuel supply module 4 includes a hydrogen supply flow path 4a that supplies hydrogen gas from a hydrogen tank 41 to the hydrogen flow path 5b of the fuel cell 5. In the hydrogen supply flow path 4a, a cutoff valve 42 is provided to cut off the supply of the hydrogen gas when the operation of the vehicle is stopped. Further, a fuel-side discharge path 4b is connected to the outlet of the hydrogen flow path 5b to discharge nitrogen mainly transmitted from the air pole and containing a small amount of hydrogen gas, or the water (steam) transmitted through the electrolyte.

A gas-liquid separator 43 is provided on the fuel-side discharge path 4b, and the hydrogen gas and water are separated by the gas-liquid separator 43. The hydrogen gas separated by the gas-liquid separator 43 is circulated in the downstream side of the hydrogen supply flow path 4a from the cutoff valve 42 by a circulation pump P2, and used again as the fuel of the fuel cell 5. Meanwhile, the water separated by the gas-liquid separator 43 or the hydrogen gas that is not used for the circulation is discharged to the fuel-side discharge path 4b, and mixed with air or water (steam) flowing into the fuel-side discharge path 4b from the oxygen-side discharge path 2c so as to be discharged to the outside. Further, in the fuel-side discharge path 4b, a drain valve that adjusts the discharge amount of the gas-liquid separator 43 or a diluter that dilutes the hydrogen gas at the joining portion with the oxygen-side discharge path 2c with air is appropriately provided, but illustration thereof is omitted.

The fuel cell system 1 is configured such that, when the vehicle starts its operation, oxygen-containing air is supplied to the air flow path 5a by the compressor 21, and the hydrogen gas is supplied to the hydrogen flow path 5b by opening the cutoff valve 42 and operating the circulation pump P2 so that the fuel cell 5 generates power. At this time, the air pressure regulating valve 3 is in the opened state to control the internal pressure of the fuel cell 5 by discharging the air remaining inside the fuel cell 5 (see FIG. 2). Meanwhile, in the fuel cell system 1, when the vehicle stops its operation, the compressor 21 is stopped so that the supply of the air to the air flow path 5a is stopped, and the cutoff valve 42 is closed and the circulation pump P2 is stopped so that the supply of the hydrogen gas to the hydrogen path 5b is stopped. At this time, the air pressure regulating valve 3 is in the closed state (see FIG. 3).

<Fluid Control Valve>

Next, the configuration of the air pressure regulating valve 3 as the fluid control valve according to the present embodiment will be described with reference to FIGS. 2 to 7. Although descriptions will be made using the vertical direction and the horizontal direction (the lateral side) based on the plane of the sheet of FIG. 2, the directions may not be necessarily consistent with the actual mounting directions of the air pressure regulating valve 3.

Figure 2:
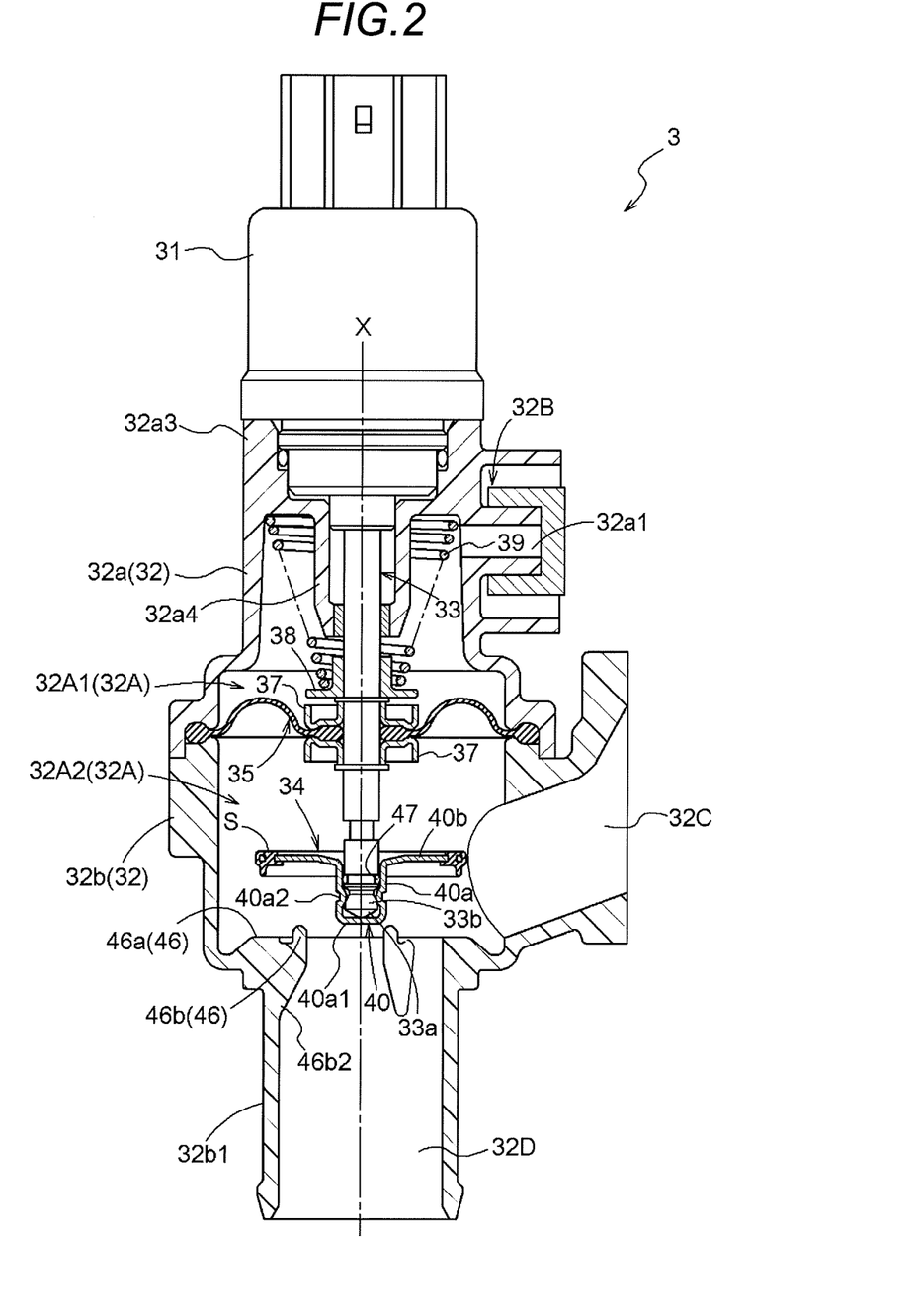
FIG. 2 is a cross-sectional view illustrating the fluid control valve at the valve opening time.
Figure 3:
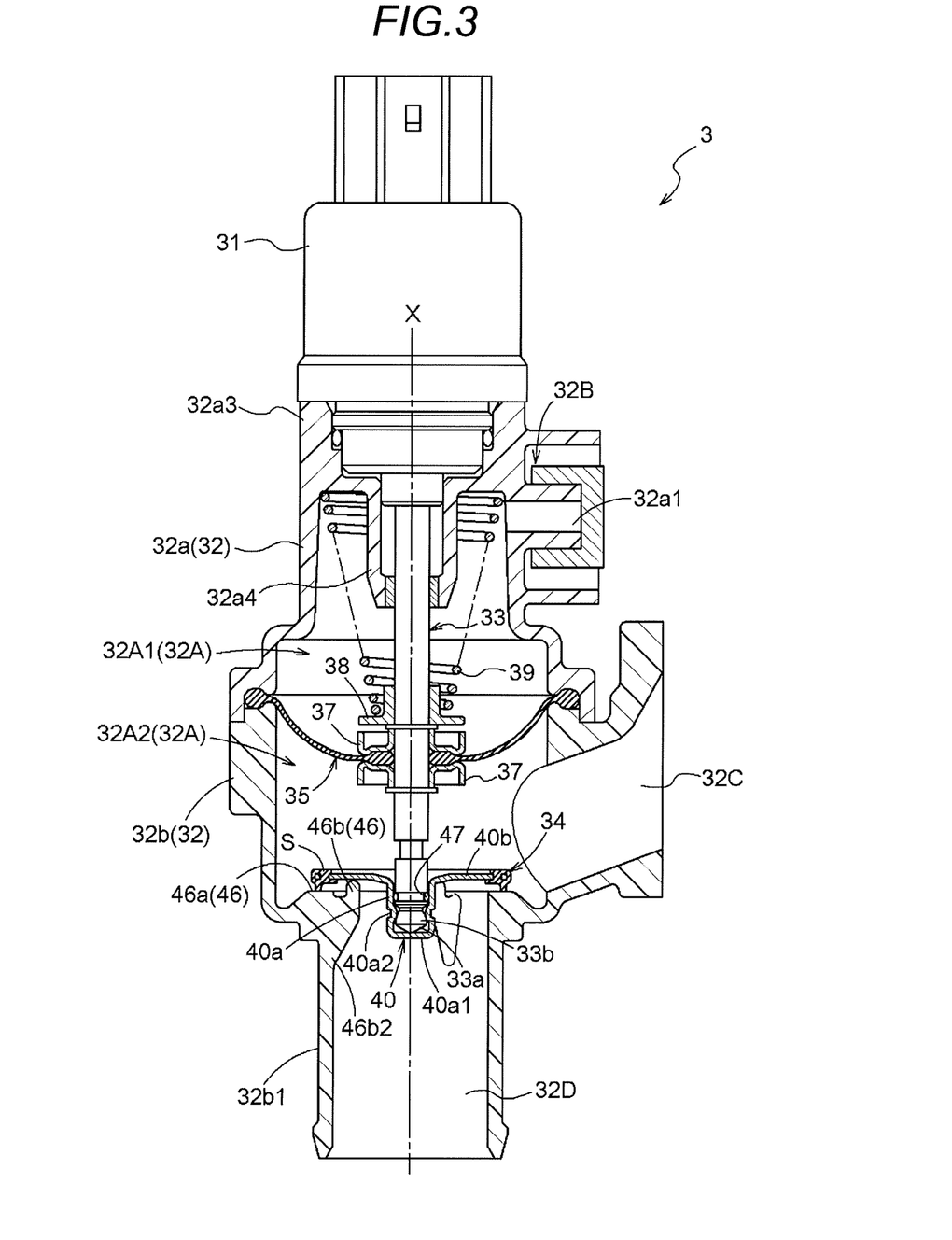
FIG. 3 is a cross-sectional view illustrating the fluid control valve at the valve closing time.

As illustrated in FIGS. 2 and 3, the air pressure regulating valve 3 includes a stepping motor 31 (an example of the driving source), a metal shaft member 33 that moves along the axis X by a driving force from the stepping motor 31 connected to one end of the shaft member 33, an annular valve body 34 connected to the other end of the shaft member 33, and a resin housing 32 that is formed by connecting an upper housing 32a and a lower housing 32b to each other and accommodates the shaft member 33 and the valve body 34.

The stepping motor 31 is fixed to the upper housing 32a in a sealing state, and configured such that, when an output axis is rotated by a screw mechanism provided on the output axis, the shaft member 33 supported to the stepping motor 31 in a rotation stopped state moves vertically along the axis X. The stepping motor 31 is capable of finely setting the moving distance of the shaft member 33 by adjusting a step angle according to the number of pulses to be applied. Since the stepping motor 31 is well-known, detailed description thereof will be omitted. In addition, the driving source is not limited to the stepping motor 31, and may be configured by, for example, a brushless motor capable of controlling a rotation angle.

The shaft member 33 is formed in a bar shape having one end to which the stepping motor 31 is connected, and the other end to which the annular valve body 34 is connected. A diaphragm 35 is provided in the middle of the shaft member 33, and the inner peripheral side thereof is held by a fixing member 37. The diaphragm 35 is formed by fixing a rubber material to a base fabric. A retainer 38 is disposed above the fixing member 37, and a compression spring 39 is provided between the retainer 38 and the upper housing 32a. The compression spring 39 presses the valve body 34 in the valve closing direction, and when the operation of the vehicle is stopped, the valve body 34 is held in the closed state by the pressing force of the compression spring 39 (see FIG. 3).

A holding member 40 is mounted on the other end of the shaft member 33. The holding member 40 includes a bottomed tubular portion 40a into which the other end of the shaft member 33 is inserted in a state of having a radial predetermined gap, a flat plate shaped main body portion 40b that extends radially outward from the opening of the tubular portion 40a, and a sealing member S that is fixed to the outer periphery of the main body portion 40b. The tubular portion 40a and the main body portion 40b are made of a metal material, and the sealing member S is made of a rubber material. The valve body 34 connected to the other end of the shaft member 33 is configured with the main body portion 40b, which is a portion of the holding member 40, and the sealing member S fixed to the outer periphery of the main body portion 40b.

The tip end of the other end of the shaft member 33 is configured with a hemispherical portion 33b that is enlarged in diameter toward a bottom portion 40a1 of the tubular portion 40a, and a conical portion 33a that is reduced in diameter toward the bottom portion 40a1 of the tubular portion 40a from the boundary surface with the hemispherical portion 33b. In the present embodiment, a recess 40a2 is formed by caulking the external surface of the tubular portion 40a and caused to be in contact with the hemispherical portion 33b such that the holding member 40 is held in a state of being suppressed from slipping off from the shaft member 33 in the direction of the axis X. Meanwhile, since the other end of the shaft member 33 is inserted into the tubular portion 40a in the state of having a radial predetermined gap, the holding member 40 (the valve body 34) may swing in a predetermined range with respect to the shaft member 33 when the hemispherical portion 33b and the conical portion 33a come into sliding-contact with the inner surface of the tubular portion 40a. In addition, without being limited to the configuration in which the holding member 40 swings with respect to the shaft member 33, the shaft member 33 itself to which the holding member 40 is fixed may swing.

In addition, an O ring 47 is provided between the shaft member 33 and the tubular portion 40a on the opposite side to the bottom portion 40a1 of the tubular portion 40a from the hemispherical portion 33b. Accordingly, since foreign matters do not penetrate into the inner surface of the tubular portion 40a, the swinging of the valve body 34 with respect to the shaft member 33 is not hindered by foreign matters.

The housing 32 is configured by fastening and fixing the upper housing 32a and the lower housing 32b to each other with bolts in a state where the outer peripheral side of the diaphragm 35 is clamped on the connection surface between the upper housing 32a and the lower housing 32b. In the accommodating space 32A of the housing 32, the above-described shaft member 33, valve body 34, diaphragm 35, compression spring 39, and others are accommodated.

A through hole 32a1 is formed on the lateral surface of the upper housing 32a to communicate an upper chamber 32A1 divided and formed by the diaphragm 35 and the upper housing 32a, and an external space 32B with each other. Accordingly, the upper chamber 32A1 is kept at the atmospheric pressure. Further, when the valve body 34 is in the closed state, a lower chamber 32A2 is formed in the space surrounded by the valve body 34, the lower housing 32b, and the diaphragm 35 to communicate with an inlet 32C (see FIG. 3).

A tubular wall 32a4 is formed at the upper portion of the upper housing 32a to extend downward (toward the valve body 34) in a tubular shape from a motor fixing portion 32a3 that fixes the stepping motor 31, and one end side of the shaft member 33 is supported to the tubular wall 32a4.

The lower housing 32b includes the inlet 32C into which air or water (steam) from the outlet of the air flow path 5a of the fuel cell 5 flows, and an outlet 32D from which the air or water (steam) flows out to the downstream side of the oxygen-side discharge path 2c when the valve body 34 is opened. In the present embodiment, the inlet 32C is formed to be opened at the lateral side of the lower housing 32b, and the outlet 32D is formed to be opened at the bottom side of the lower housing 32b.

An annular valve seat 46 is formed in the lower housing 32b such that the valve body 34 abuts on the valve seat 46 to block a communication between the inlet 32C and the outlet 32D. The valve seat 46 includes an abutment portion 46a on which the sealing member S of the valve body 34 abuts, and a protruding portion 46b that protrudes upward (toward the main body portion 40b) from the abutment portion 46a in a state of extending radially inward from the abutment portion 46a. The abutment portion 46a is configured by the flat surface that becomes the ceiling of a peripheral wall portion 32b1 constituting the outlet 32D in the lower housing 32b. The protruding portion 46b protrudes upward (toward the valve body 34) from a base end portion 46b2 extending radially inward in a tapered shape from the peripheral wall portion 32b1 constituting the outlet 32D in the lower housing 32b. Accordingly, in the state where the sealing member S abuts on the abutment portion 46a, a tip end 46b1 of the protruding portion 46b abuts on the main body portion 40b of the valve body 34 so that the movement of the valve body 34 is regulated (see FIG. 6). In addition, the height relationship between the abutment portion 46a and the protruding portion 46b is not limited to the above-described embodiment, and the protruding portion 46b may be provided at a lower position than the abutment portion 46a or at the same height as that of the abutment portion 46a as long as the protruding portion 46b may regulate the movement of the valve body 34.

Figure 4:
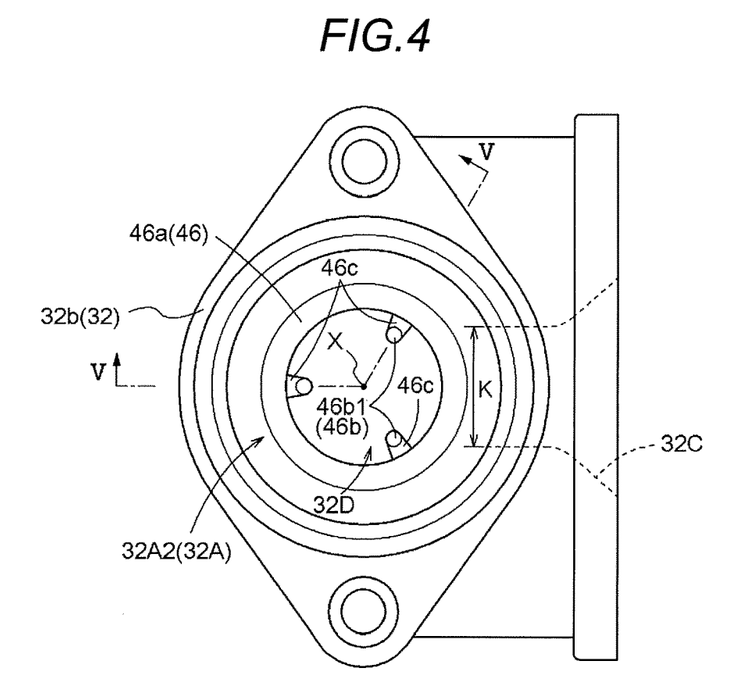
FIG. 4 is a plan view of a lower housing.

As illustrated in FIG. 4, a plurality (three in the present embodiment) of protruding portions 46b are provided at equal intervals along the circumferential direction of the valve seat 46, and the protruding portions 46b are separated from each other along the circumferential direction. Further, the tip ends 46b1 of the plurality of protruding portions 46b are each formed in a hemispherical shape and are arranged on the same (horizontal) plane. When the tip ends 46b1 abut on the main body portion 40b of the valve body 34, the movement of the valve body 34 is regulated (see FIGS. 5 and 6). The protruding portions 46b are arranged in the area excluding a virtual area K where the opening of the inlet 32C extends and crosses the valve body 34. That is, the protruding portions 46b are arranged at locations excluding the shortest path connecting the inlet 32C and the outlet 32D to each other. As described above, without providing the protruding portions 46b each serving as a flow path resistance on the shortest path through which a large amount of fluid flows, a pressure loss of the fluid at the valve opening time may be suppressed. Further, the base end portion 46b2 of each protruding portion 46b is also formed in a tapered shape so that the flow path resistance is reduced (see FIGS. 5 to 7).

Figure 5:
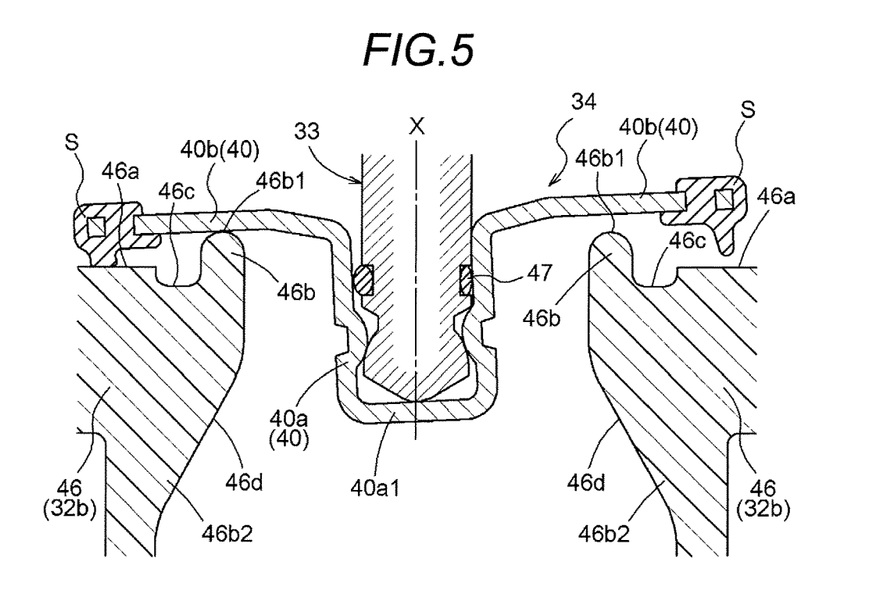
FIG. 5 is an enlarged cross-sectional view taken from V-V in FIG. 4 in which a valve body and a valve seat are illustrated in a state where the valve closing is started.
Figure 6:
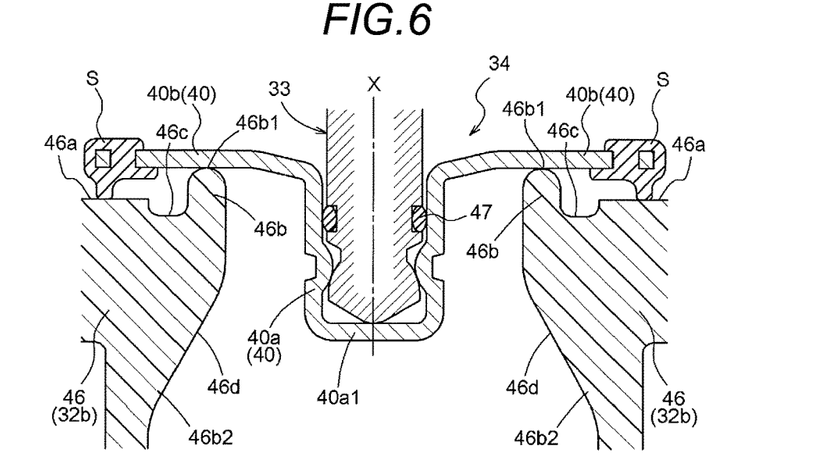
FIG. 6 is an enlarged cross-sectional view illustrating the valve body and the valve seat in a state where the valve closing is completed.
Figure 7:
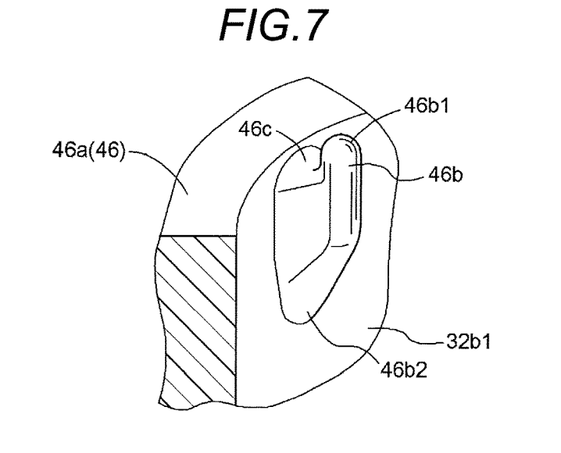
FIG. 7 is an enlarged perspective view of a protruding portion.

As illustrated n FIGS. 5 to 7, a recess 46c is formed between the abutment portion 46a and the protruding portion 46b to be recessed downward (toward the opposite side to the valve body 34) from the abutment portion 46a. The recess 46c is formed by a curved surface that constitutes the top surface of the base end portion 46b2 of the protruding portion 46b and is inclined to the outlet 32D (in the flowing direction of the fluid) as approaching the end of the curved surface from the axis of the shaft. Alternatively, the recess 46c may be omitted.

When the valve body 34 is closed, the parallelism between the valve body 34 and the valve seat 46 may not be constant due to the fluid pressure that the valve body 34 receives from the fluid or the dimensional error of the components. In this case, for example, as illustrated in FIG. 5, when the shaft member 33 connected to the valve body 34 at the other end thereof is moved along the axis X, the sealing member S on one side (the left side) is pressed against the abutment portion 46a. At this time, in the present embodiment, since the valve seat 46 has the protruding portion 46b that abuts on the main body portion 40b of the valve body 34 to regulate the movement of the valve body 34, as a separate component from the abutment portion 46a on which the sealing member S abuts, the transformation amount of the sealing member S may be set to be equal to or less than a predetermined value even though the shaft member 33 is moved such that the sealing member S is pressed against the abutment portion 46a. As a result, excessive pressing stress does not act on the sealing member S, and thus, the durability of the seal member S is not impaired. Further, since the protruding portion 46b having the stopper function to regulate the movement of the valve body 34 is provided in the lower housing 32b, the number of the components may be reduced, and the rigidity of the protruding portion 46b may be enhanced.

Further, since the valve body 34 is configured to be capable of swinging with respect to the shaft member 33, the valve body 34 is corrected to be in a parallel posture with respect to the valve seat 46 based on the protruding portion 46b of the left side as a fulcrum, when the stepping motor 31 causes the driving force for further moving the shaft member 33 downward to act on the shaft member 33, as illustrated in FIG. 6. That is, in the present embodiment, the protruding portion 46b has also the function of correcting the posture of the valve body 34. Especially, in the present embodiment, since the plurality of protruding portions 46b are arranged uniformly in the circumferential direction, the valve body 34 may be supported to be well-balanced. Further, since the tip end of each protruding portion 46b is formed in a hemispherical shape, the posture of the valve body 34 may be easily changed.

When the protruding portions 46b are provided to be separate from each other in the circumferential direction as in the present embodiment, foreign matters such as water droplets attached to the abutment portion 46a of the valve seat 46 may be dropped toward the outlet 32D from between adjacent protruding portions 46b. Further, since the recess 46c is provided between the abutment portion 46a and the protruding portion 46b, the foreign matters such as water droplets that have passed the abutment portion 46a of the valve seat 46 may be dropped into the recess 46c. Further, since the surface of the recess 46c is configured by the curved surface that is inclined toward the outlet 32D, the foreign matters dropped into the recess 46c are quickly discharged toward the outlet 32D. As a result, it is possible to solve the problem in that the foreign matters are deposited between the sealing member S of the valve body 34 and the abutment portion 46a, and thus, the sealing function is impaired.

Other Embodiments (a) (Another Embodiment 1)

Figure 8:
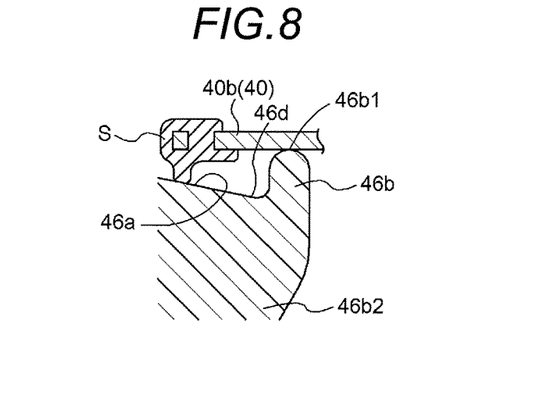
FIG. 8 is an enlarged cross-sectional view of a fluid control valve according to Another Embodiment 1.

Instead of the recess 46c provided in the valve seat 46 in the above-described embodiment, a tapered portion 46d may be provided to be inclined toward the outlet 32D in the area from the abutment portion 46a to the protruding portion 46b, as illustrated in FIG. 8. In this case as well, since the foreign matters are discharged along the tapered portion 46d, it is possible to solve the problem in that the foreign matters are deposited between the sealing member S of the valve body 34 and the abutment portion 46a, and thus, the sealing function is impaired.

(b) (Another Embodiment 2)

Figure 9:
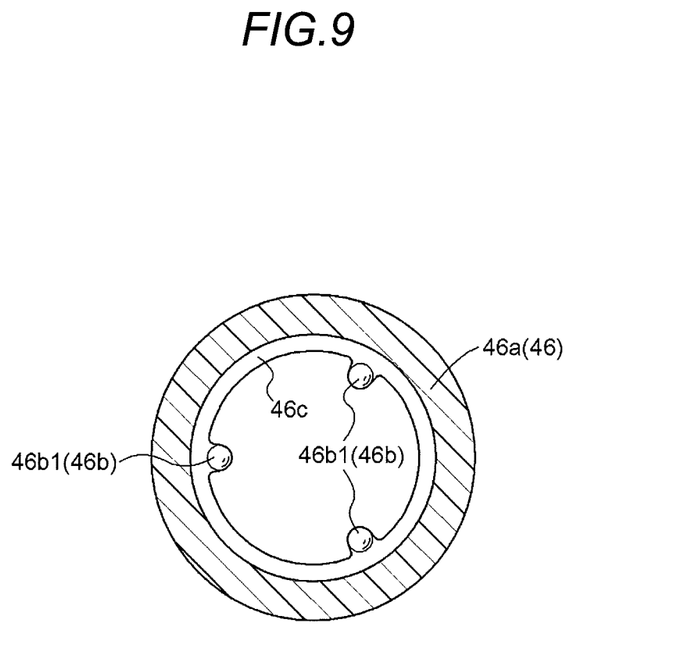
FIG. 9 is a plan view of a housing according to Another Embodiment 2.

In the above-described embodiment, as illustrated in FIG. 4, recesses 46c are provided to be separate from each other in the circumferential direction. However, as illustrated in FIG. 9, a recess 46c may be provided over the entire circumferential direction, and only the protruding portions 46b may be provided to be separate from each other in the circumferential direction. Further, instead of forming the base end portion 46b2 of each protruding portion 46b to extend radially inward from the inner peripheral wall of the portion of the lower housing 32b that constitutes the outlet 32D, the base end portion 46b2 of the protruding portion 46b may be provided over the entire circumferential direction. As a result, the rigidity of the protruding portion 46b may be further enhanced.

(c) The inlet 32C is provided on the lateral side of the lower housing 32b, and the outlet 32D is provided at the bottom side of the lower housing 32b. However, the inlet 32C and the outlet 32D may be exchanged with each other. In this case, in the above-described embodiment, the inlet 32C is replaced with the outlet 32D, and the outlet 32D is replaced with the inlet 32C.

(d) The configuration that causes the valve body 34 to swing with respect to the shaft member 33 is not limited to the above-described embodiment. For example, the other end of the shaft member 33 may be formed in a spherical shape.

(e) In the above-described embodiment, the fluid control valve used in the fuel cell system 1 has been described. However, the fluid control valve may be used as a fluid control valve for other vehicles or a fluid control valve for household appliances without specific limitation.

This disclosure may be used for a fluid control valve that controls a flow amount and a pressure of a fluid.

A feature of a fluid control valve resides in that the fluid control valve includes: a shaft member that moves along an axis of the shaft by a driving force from a driving source connected to one end of the shaft member; a valve body that is connected to the other end of the shaft member and includes a flat plate shaped main body portion having an outer periphery to which a sealing member is fixed; a housing that includes an inlet and an outlet for a fluid, has an annular valve seat on which the valve body abuts to block a communication between the inlet and the outlet, and accommodates the shaft member and the valve body, wherein the valve body is configured to be capable of swinging with respect to the shaft member, the valve seat includes an abutment portion on which the sealing member abuts, and a protruding portion that protrudes toward the main body portion from the abutment portion in a state of extending radially inward from the abutment portion, and a tip end of the protrusion portion abuts on the main body portion in the state where the sealing member abuts on the abutment portion, so as to regulate movement of the valve body.

In this configuration, since the valve body is configured to be capable of swinging with respect to the shaft member, the sealing member provided on the outer periphery of the main body portion is pressed against the abutment portion of the valve seat over the entire circumference of the valve seat when the shaft member connected to the valve body at the other end thereof is moved along the axis, so that the sealing function is assured. At this time, since the valve seat is provided with the protruding portion which is separate from the abutment portion on which the sealing member abuts, to abut on the main body portion of the valve body so as to regulate the movement of the valve body, the excessive transformation of the sealing member may be suppressed. As a result, it is avoided that excessive pressing stress acts on the sealing member, and thus, the durability of the sealing member is impaired.

Further, since the housing is provided with the protruding portion having a stopper function to regulate the movement of the valve body, the number of components may be reduced, and simultaneously, the rigidity of the protruding portion may be enhanced. Accordingly, the fluid control valve capable of improving the durability of the sealing member while assuring the sealing function may be provided.

Another feature of the fluid control valve resides in that a plurality of the protruding portions are installed in a circumferential direction of the valve seat at predetermined intervals, and tip ends of the plurality of the protruding portions that abut on the main body portion are arranged on same plane.

When the protruding portions are installed to be separate from each other in the circumferential direction of the valve seat as in the present configuration, foreign matters such as water droplets attached to, for example, the abutment portion of the valve seat may be dropped in the flow path direction between adjacent protruding portions. As a result, it is possible to solve the problem in that the foreign matters are deposited between the sealing member of the valve body and the abutment portion, and thus, the sealing function is impaired. Further, since the tip ends of the protruding portions that abut on the main body portion are arranged on the same plane, the valve body swings based on one protruding portion as a fulcrum, and thus, abuts on the other protruding portions when the shaft member is moved along the axis to press the valve body against the valve seat, so that the parallelism between the valve body and the valve seat may be assured. As a result, since the transformation amount of the sealing member becomes constant, the durability of the sealing member may be improved while assuring the sealing function.

Another feature of the fluid control valve resides in that the plurality of the protruding portions are arranged at locations excluding a shortest path connecting the inlet and the outlet to each other.

The precision of the flow rate control at the valve opening time may be improved without installing a protruding portion serving as a flow path resistance on the shortest path in which a large amount of fluid flows, as in the present configuration.

Another feature of the fluid control valve resides in that a recess is formed between the abutment portion and the protruding portion to be recessed from the abutment portion toward an opposite side to the valve body.

When the recess is provided between the abutment portion and the protruding portion as in the present configuration, stay of water or deposition of foreign matters in the vicinity of the abutment portion of the valve seat may be suppressed. As a result, it is possible to solve the problem in that the sealing function is impaired by freezing/fixation resulting from the stay of water or the caught of the foreign matters at the abutment portion.

Another feature of the fluid control valve resides in that a surface of a bottom portion of the recess is configured by a curved surface that is inclined toward a flowing direction of the fluid as approaching an end of the curved surface from the axis of the shaft.

When the surface of the recess is configured by a curved surface that is inclined toward the flow path direction as in the present configuration, water droplets or foreign matters dropping in the recess are quickly discharged. As a result, it is avoided that foreign matters or the like are deposited in the recess and reach the abutment portion so that the sealing performance of the valve body is deteriorated.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A fluid control valve comprising:
a shaft member that axially moves by a driving force from a driving source connected to one end of the shaft member;
a valve body that is connected to another end of the shaft member and includes a flat plate shaped main body portion having an outer periphery to which a sealing member is fixed;
a housing that includes an inlet and an outlet for a fluid, has an annular valve seat on which the valve body abuts to block a communication between the inlet and the outlet, and accommodates the shaft member and the valve body,
wherein the valve body is configured to be swingable with respect to the shaft member,
the valve seat includes an abutment portion on which the sealing member abuts, and a plurality of circumferentially spaced apart protruding portions that each protrude toward the main body portion in a direction away from the abutment portion, the plurality of circumferentially spaced apart protruding portions being positioned radially inward of the abutment portion, each of the plurality of circumferentially spaced apart protruding portions possessing a tip end, and
the tip end of each of the protruding portions abutting on the main body portion in a state in which the sealing member abuts on the abutment portion, so as to regulate movement of the valve body.

2. The fluid control valve according to claim 1,
wherein the tip ends of the plurality of the protruding portions that abut on the main body portion are located in a common plane.

3. The fluid control valve according to claim 2,
wherein the inlet is positioned between two of the protruding portions that are circumferentially adjacent one another so that fluid flow from the inlet to the outlet passes between the two protruding portions that are circumferentially adjacent one another.

4. The fluid control valve according to claim 1,
wherein a recess is positioned radially between the abutment portion and the protruding portions, the recess being recessed in a direction toward the outlet of the housing.

5. The fluid control valve according to claim 4,
wherein a bottom portion of the recess is a curved surface that is inclined toward a flowing direction of the fluid as approaching an end of the curved surface from the axis of the shaft member.

6. The fluid control valve according to claim 1, wherein the abutment portion is a flat surface, and when the shaft member is vertically oriented, the tip ends of the protruding portions are positioned vertically higher than the flat surface constituting the abutment portion.

7. A fluid control valve comprising:
a shaft member that possesses an axis, one end and an opposite end, the shaft member being axially movable by a driving force from a driving source connected to the one end of the shaft member;
a valve body connected to the opposite end of the shaft member, the valve body including a plate-shaped main body portion to which a sealing member is fixed;
a housing that accommodates the shaft member and the valve body, the housing including an inlet and an outlet for a fluid;
the housing also including an annular valve seat comprised of a flat annular surface, the sealing member being movable into contact with the flat annular surface during the axial movement of the shaft member in one axial direction so that contact of the sealing member with the flat annular surface of the valve seat blocks communication between the inlet and the outlet, and being movable out of contact with the flat annular surface during the axial movement of the shaft member in an axial direction opposite the one axial direction to permit communication between the inlet and the outlet;
the valve body being configured to be swingable with respect to the shaft member;
the valve seat also includes a plurality of protruding portions that each protrude toward the main body portion in a direction away from the flat annular surface so that the protruding portions each extend above the flat annular surface, and the valve seat includes an abutment portion on which the sealing member abuts, the protruding portions being positioned radially inward of the flat annular surface, each of the protruding portions possessing a tip end; and
the tip end of each of the protruding portions abutting on the main body portion when the sealing member abuts on the flat annular surface to regulate movement of the valve body.

8. The fluid control valve according to claim 7, wherein the tip ends of the protruding portions that abut on the main body portion are located in a common plane.

9. The fluid control valve according to claim 7, wherein the inlet is positioned between two of the protruding portions that are circumferentially adjacent one another so that fluid flow from the inlet to the outlet passes between the two protruding portions that are circumferentially adjacent one another.

10. The fluid control valve according to claim 7, wherein a recess is positioned radially between the flat annular surface and the protruding portions, the recess being recessed in a direction away from the main body portion.

11. The fluid control valve according to claim 10, wherein the recess is annular and includes a bottom portion constituted by a curved surface that is inclined toward a flowing direction of the fluid as approaching an end of the curved surface from the axis of the shaft member.

12. A fluid control valve comprising:
a shaft member that possesses an axis, one end and an opposite end, the shaft member being axially movable by a driving force from a driving source connected to the one end of the shaft member;
a valve body connected to the opposite end of the shaft member, the valve body including a plate-shaped main body portion to which a sealing member is fixed;
a housing that accommodates the shaft member and the valve body, the housing including an inlet and an outlet for a fluid;
the housing also including a valve seat, the valve seat comprising an abutment portion contacted by the sealing member during the axial movement of the shaft member in one axial direction to create a seal between the sealing member and the abutment portion that blocks communication between the inlet and the outlet, the sealing member being movable out of contact with the abutment portion during the axial movement of the shaft member in an axial direction opposite the one axial direction to permit communication between the inlet and the outlet;
the valve body being configured to be swingable with respect to the shaft member;
the valve seat also includes a plurality of protruding portions that each protrude toward the main body portion in a direction away from the abutment portion, the protruding portions being positioned radially inward of the abutment portion, each of the protruding portions possessing a tip end; and
the tip end of each of the protruding portions abutting on the main body portion when the sealing member abuts on abutment portion to regulate movement of the valve body.

13. The fluid control valve according to claim 12, wherein the tip ends of the protruding portions that abut on the main body portion are located in a common plane.

14. The fluid control valve according to claim 12, wherein the inlet is positioned between two of the protruding portions that are circumferentially adjacent one another so that fluid flow from the inlet to the outlet passes between the two protruding portions that are circumferentially adjacent one another.

15. The fluid control valve according to claim 12, wherein a recess is positioned radially between the abutment portion and the protruding portions, the recess being recessed in a direction away from the main body portion.

16. The fluid control valve according to claim 15, wherein the recess is annular and includes a bottom portion constituted by a curved surface that is inclined toward a flowing direction of the fluid as approaching an end of the curved surface from the axis of the shaft member.

17. The fluid control valve according to claim 12, wherein the plurality of protruding portions includes three protruding portions.

18. The fluid control valve according to claim 12, wherein the plurality of protruding portions includes three protruding portions circumferentially spaced apart from one another at equal angular intervals.

19. The fluid control valve according to claim 12, wherein the abutment portion is a flat surface, and when the shaft member is vertically oriented, the tip ends of the protruding portions are positioned vertically higher than the flat surface constituting the abutment portion.

\* \* \* \* \*